United States Patent Office 3,485,817
Patented Dec. 23, 1969

3,485,817
1,5-BIS(SUBSTITUTED-SULFONYL)-3-SUBSTI-
TUTED-1,3,5-HEXAHYDROTRIAZEPINE
Stanley J. Strycker, Midland, Mich., assignor to The Dow
Chemical Company, Midland, Mich., a corporation of
Delaware
No Drawing. Filed Dec. 19, 1966, Ser. No. 602,596
Int. Cl. C07d 55/54; A01n 9/14; C11d 9/50
U.S. Cl. 260—239                                    4 Claims The present invention is directed to 1,5-bis(substituted-sulfonyl) - 3 - substituted - 1H-1,3,5-hexahydrotriazepines. The new compounds of the present invention correspond to the formula

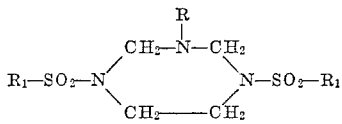

In the present specification and claims R represents lower alkyl, cyclohexyl, 2-methoxyethyl, 2-hydroxyethyl, monohalophenyl, tolyl, monomethoxyphenyl, lower alkanesulfonic acid alkali metal salt, α-methyl-β-hydroxyethyl or carboethoxymethyl and $R_1$ represents alkyl, monohalophenyl, tolyl, mononitrophenyl, or monomethoxy phenyl.

In the present specification and claims "lower alkyl" and "lower alkane" represent alkyl and alkane moieties containing from 1, to 2, to 3, to 4, to 5, to 6 carbon atoms inclusive, such as methyl, ethyl, propyl, isopropyl, butyl, tertiary butyl, secondary butyl, amyl, and hexyl, alkyl represents alkyl moieties containing from 1 to 12 carbon atoms, inclusive, alkali metal salt represents sodium or potassium and "halo" represents bromine or chlorine. The compounds of the present invention are solids and are of limited solubility in water and of varying degrees of solubility in common organic solvents. The novel compounds of the present invention have been found to be useful as pesticides for the control and kill of various pests such as insects, helminths, bacteria, arachnids, fungi and plants. Representative pests include *Bacillus subtilis, Salmonella typhosa, Aerobacter aerogenes, Staphylococcus aureus,* cockroaches, plum curculio, *Pseudomonas aeruginosa, Aspergillus terreus, Candida pelliculosa, Pullularia pullulans,* two-spotted spider mites, snails, fish, and certain dicotyledonous plants.

The new compounds of the present invention are prepared by reacting together an ethylene-bis(substituted-sulfonamide) corresponding to the formula

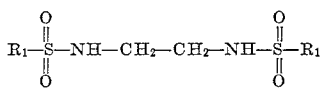

and a primary amine corresponding to the formula

in the presence of formaldehyde. The reactants are conveniently combined in an inert solvent as reaction medium, such as water, ethanol, isopropanol, ethyl acetate, chloroform or dimethylformamide. The reaction proceeds readily with the production of the desired product at temperatures of from 0° to 100° C. and preferably at temperatures between 20° and 60° C. When employing low boiling amines it may be desirable to carry out the reaction at low temperatures or under pressure. The proportions of the reactants to be employed are not critical, some of the desired product being formed when contacting the reactants in any proportions. The reaction consumes the ethylene-bis(sulfonamide) and the primary amine in equimolar proportions, with the formaldehyde being consumed in a molecular ratio of 2:1 with respect to either the ethylene-bis(substituted-sulfonamide) or the primary amine. However, in order to obtain optimum yields the formaldehyde is employed in molar proportions of at least 3 to 1 with respect to the ethylene-bis(substituted-sulfonamide). Larger excesses of formaldehyde do not impair the production of the desired product.

In carrying out the reaction, the reactants are contacted in any order or fashion and the reaction mixture thereafter maintained at a temperature in the reaction temperature range for a short period of time. However, in preferred procedures the ethylene-bis(substituted-sulfonamide) and the formaldehyde are contacted and the resulting mixture warmed until a homogeneous reaction mixture is obtained. Thereafter the primary amine is added with stirring. In most cases, the product precipitates in the reaction mixture as a crystalline solid material. Following the reaction period, the crystalline solid product can be removed by such convenient and conventional procedures as decantation or filtration. In those cases wherein the product does not precipitate in the reaction mixture, the product can be caused to precipitate by such convenient procedures as cooling the reaction mixture, or by concentrating the reaction mixture to decrease the amount of solvent present. In another convenient procedure, the low boiling constituents can be removed by distillation to obtain the desired product as a residue. The product obtained by such conventional procedures can be employed in pesticidal applications or further purified by such conventional procedures as washing with an appropriate solvent or recrystallization.

The following examples are merely illustrative and are not intended to be limiting.

EXAMPLE 1

Ethylene-bis(methanesulfonamide) (11.1 grams; 0.051 mole) was dispersed in 40 grams of aqueous 37 percent formaldehyde (0.36 mole). This dispersion was then heated until the sulfonamide was dissolved and the heated mixture thereafter cooled to 5° C. whereupon 40 percent aqueous methyl amine (5.6 grams; 0.075 mole) was added slowly with stirring to the reaction mixture. Following the contacting of the reactants, the reaction mixture was maintained at below 10° C. for a short period of time. During the reaction period a fine white solid gradually formed and precipitated in the reaction mixture. This product was collected by filtration and dissolved in 900 milliliters of hot isopropanol. The isopropanol solution was then concentrated by evaporation and cooled to facilitate the crystallization of the hexahydro-3-methyl-1,5-bis(methylsulfonyl)-1H-1,3,5-triazepine product. The crystalline product was collected by filtration and found to melt at 182°–183° C.

EXAMPLE 2

Ethylene-bis(methanesulfonamide) (21.6 grams; 0.1 mole) was slurried in aqueous formaldehyde and warmed on a steam bath until the sulfonamide dissolved. 3-amino propane sulfonic acid (14 grams; 0.1 mole) was dissolved in 20 grams of aqueous 20 percent sodium hydroxide solution to produce an aqueous solution of the sodium salt of 3-aminopropane sulfonic acid. The aqueous salt solution was then added to the ethylene-bis(methanesulfanomide) and formaldehyde reaction mixture with stirring and the resulting mixture maintained at between 7° and 10° C. Stirring was thereafter continued for two hours. Following this two hour period, the reaction mixture was heated to a temperature of 70° and maintained at that temperature for 15 minutes. Thereafter, the reaction mixture was cooled and the white precipitate which formed during the cooling was separated by filtration. This white precipitate was dissolved in 400 milliliters of aqueous ethanol and the aqueous ethanol solution concentrated and cooled to cause the white hexahydro-1,5-bis (methylsulfonyl) - 1H - 1,3,5 - triazepine - 3 - (2H)-propane sulfonic acid sodium salt product to precipitate as a crystalline solid. This crystalline solid product was found to melt at 255°–256° C. with decomposition.

In substantially the same manner the following compounds of the present invention were prepared.

Hexahydro - 3 - isopropyl - 1,5 - bis(methylsulfonyl)-1H-1,3,5-triazepine (M.P., 159°–161° C.) by reacting together ethylene-bis(methanesulfonamide), aqueous 37 percent formaldehyde and isopropyl amine.

Hexahydro - α - methyl - 1,5 - bis(methylsulfonyl)-1H-1,3,5-triazepine-3-(2H)-ethanol (M.P., 150°–152° C.) by reacting together ethylene-bis(methanesulfonamide), aqueous 37 percent formaldehyde and isopropanol amine.

Hexahydro - 3 - (2 - methoxyethyl) - 1,5 - bis(methylsulfonyl)-1H-1,3,5-triazepine (M.P., 165°–168° C.) by reacting together ethylene - bis(methanesulfonamide), aqueous 37 percent formaldehyde and 2-methoxyethyl amine.

3 - hexyl - hexahydro - 1,5 - bis(methylsulfonyl) - 1H-1,3,5-triazepine (M.P., 150°–151° C.) by reacting together ethylene-bis(methanesulfonamide), aqueous 37 percent formaldehyde and n-hexylamine.

Hexahydro - 3 - cyclohexyl - 1,5 - bis(methylsulfonyl)-1H-1,3,5-triazepine (molecular weight 339.48) by reacting together ethylene-bis(methanesulfonamide), aqueous 37 percent formaldehyde and cyclohexyl amine.

Hexahydro - 1,5 - bis(methylsulfonyl) - 3 - n - butyl-1H-1,3,5-triazepine (molecular weight 313.62) by reacting together ethylene-bis(methanesulfonamide), n-butyl-amine and formaldehyde.

Hexahydro - 1,5 - bis(methylsulfonyl) - 3 - ethyl-1H-1,3,5-triazepine (molecular weight 285.38) by reacting together ethylene-bis(methanesulfonamide), formaldehyde and ethyl amine.

Hexahydro - 1,5 - bis[(p - methoxyphenyl)sulfonyl]-1H-1,3,5-triazepine-3(2H)-ethanol (melting at 275° C.) by reacting together ethylene-bis(p-methoxyphenylsulfonamide), aqueous formaldehyde and 2-hydroxyethylamine.

3 - (4 - chlorophenyl) - 1,5 - bis[4 - chlorophenylsulfonyl]hexahydro-1H-1,3,5-triazepine (melting at 191.5°–193° C.) by reacting together ethylene-bis(p-chlorophenylsulfonamide), aqueous formaldehyde and p-chloroaniline.

Hexahydro - 3 - methyl - 1,5 - bis(p - tolylsulfonyl)-1H-1,3,5-triazepine (melting at 240°–241° C.) by reacting together ethylene-bis(p-tolylsulfonamide), aqueous formaldehyde and methyl amine.

1,5 - bis[(p - bromophenyl)sulfonyl]hexahydro - 1H-1,3,5-triazepine-3(2H)-ethanol (melting at 196°–197° C.) by reacting together ethylene-bis(p-bromophenylsulfonamide), aqueous formaldehyde and 2-hydroxyethylamine.

Hexahydro - 3 - (2 - methoxyethyl) - 1,5 - bis[(4-methoxyphenyl)sulfonyl]-1H-1,3,5-triazepine (melting at 131.5°–132° C.) by reacting together ethylene-bis(4-methoxyphenylsulfonamide), aqueous formaldehyde and 2-methoxyethylamine.

3 - dodecylhexahydro - 1,5 - bis(methylsulfonyl) - 1H-1,3,5 - triazepine (melting at 140°–142° C.), by reacting together ethylene-bis(methylsulfonamide), aqueous formaldehyde and dodecyl amine.

Ethyl hexahydro - 1,5 - bis(methylsulfonyl) - 1H - 1,3,5-triazepine-3(2H)-acetate (melting at 170°–173° C.) by reacting together ethylene-bis(methylsulfonamide), aqueous formaldehyde and carboxymethyl amine ethyl ester.

1,5 - bis(butylsulfonyl) - 3 - dodecylhexahydro - 1H-1,3,5 - triazepine (melting at 145°–146° C.) by reacting together ethylene-bis(butylsulfonamide), aqueous formaldehyde and dodecyl amine.

3 - heptyl - 1,5 - bis(hexylsulfonyl)hexahydro - 1H-1,3,5-triazepine (molecular weight 495.76) by reacting together ethylene-bis(hexylsulfonamide), aqueous formaldehyde and heptyl amine.

Hexahydro - (α - methyl) - 1,5 - bis(phenylsulfonyl)-1H-1,3,5-triazepine-2(2H)-ethanol (molecular weight 439.53) by reacting together ethylene-bis(phenylsulfonamide), aqueous formaldehyde and 2-hydroxypropyl-amine.

Hexahydro - 1,5 - bis(m - tolylsulfonyl) - 1H - 1,3,5-triazepine-3 - (2H)-propane sulfonic acid potassium salt (molecular weight 451.65) by reacting together ethylene-bis(m-tolylsulfonamide), aqueous formaldehyde, 2-amino propane sulfonic acid and potassium hydroxide.

Hexahydro - 3 - methyl - 1,5 - bis[(o - nitrophenyl)-sulfonyl]-1H - 1,3,5 - triazepine (melting at 162.5–165.5° C.) by reacting together ethylene-bis(o-nitrophenylsulfonamide), aqueous formaldehyde and methyl amine.

Hexahydro - 3 - (3 - chlorophenyl) - 1,5 - bis[(m - nitrophenyl)sulfonyl]-1H-1,3,5-triazepine (molecular weight 581.77) by reacting together ethylene-bis(m-nitrophenylsulfonamide), aqueous formaldehyde and 3-chloroaniline.

Hexahydro - 3 - hexyl - 1,5 - [(p - nitrophenyl)sulfonyl]-1H-1,3,5-triazepine (molecular weight 555.61) by reacting together ethylene bis(p-nitrophenylsulfonamide), aqueous formaldehyde and hexyl amine.

Hexahydro - 1,5 - bis[(o - nitrophenyl)sulfonyl] - 3-(phenethyl)-1H-1,3,5-triazepine (melting at 189°–190.5° C.) by reacting together ethylene - bis(o-nitrophenylsulfonamide), aqueous formaldehyde and phenethylamine.

Hexahydro - 3 - methyl - 1,5 - bis(o - tolylsulfonyl)-1H-1,3,5-triazepine (melting at 169.5°–171.5° C.) by reacting together ethylene-bis(o-tolylsulfonamide), aqueous formaldehyde and methyl amine.

Hexahydro - 1,5 - bis(ethylsulfonyl) - 3 - (3 - methoxyphenyl)-1H-1,3,5-triazepine (molecular weight 362.43) by reacting together ethylene-bis(ethylsulfonamide), aqueous formaldehyde and 3-methoxyaniline.

Hexahydro - 1,5 - bis[(p - methoxyphenyl)sulfonyl]-3 - (p - methoxyphenyl) - 1H - 1,3,5 - triazepine (molecular weight 547.61) by reacting together ethylene-bis(p-methoxyphenylsulfonamide), aqueous formaldehyde and 4-methoxyaniline.

1,5 - bis(propylsulfonyl)hexahydro - 3 - (p - tolyl)-1H-1,3,5-triazepine (molecular weight 403.56) by reacting together aqueous formaldehyde, ethylene-bis(propylsulfonamide) and p-toluidine.

The compounds of the present invention are useful as pesticides for the control of many pest organisms. For such use the unmodified compounds can be used. Alternatively, the compound can be dispersed on an inert finely divided solid and the resulting preparation employed as a dust. Also, such preparation can be dispersed in water with or without the aid of a wetting agent and the resulting aqueous dispersion employed as sprays. In other procedures the compound can be employed in a solvent or as a constituent in a solvent-in-water or water-in-solvent emulsion or as an aqueous dispersion thereof which can be applied as a spray, drench or wash.

The compounds of the present invention or compositions containing the same, can be applied to pests or their habitats or food in parasiticidal amounts to obtain excellent controls and kills of many organisms. The compounds can be employed as slimicides in the white water in paper mills or the water employed in cooling towers. Additionally, the compounds can be included in inks, adhesives, soaps, cutting oils, or oil or latex paints to prevent mold and mildew, and the degradation of such products resulting from microbial attack. Further, the compounds can be distributed in textiles or cellulosic materials, or can be employed in the impregnation of wood and lumber to preserve and protect such products from the attack of the fungal agents of rot, mold, mildew and decay.

The compounds conveniently can be employed in liquid or dust compositions. In such usage, the compounds are modified with one or a plurality of adjuvants or helpers including water, organic solvents, petroleum oils, petroleum distillates, naphthas or other liquid carriers, surface active dispersing agents and finely divided solids such as chalk, talc or bentonite. Depending upon the concentration of the parasiticide compounds in such formulations, the augmented compositions are adapted to be distributed on plants or plant parts, or in soil, inks, adhesives, cutting oils, paints, textiles, paper, lumber, white or cooling waters, or to be employed as concentrates and subsequently diluted with additional liquid or solid adjuvants to produce the ultimate treating compositions.

The exact concentration of the novel compounds to be employed in the treating compositions is not critical and may vary considerably provided the required amount of effective agent is supplied on the plant or plant part or in the soil, ink, adhesive, cutting oil, textile, paper, wood and so forth. The concentration of toxicant in liquid compositions generally is from about 1 to 50 percent by weight. Concentrations up to 95 percent by weight oftentimes are conveniently employed. In dusts, the concentration of the toxicant can be from about 1 to 10 percent by weight. In compositions to be employed as concentrates, the toxicant can be present in a concentration of from 5 to 98 percent by weight.

In representative operations aqueous compositions containing one of hexahydro-3-methyl-1,5-bis(methylsulfonyl)-1H-1,3,5-triazepine, 3-hexyl - hexahydro - 1,5 - bis (methylsulfonyl)-1H - 1,3,5 - triazepine, hexahydro - α-methyl-1,5 - bis(methylsulfonyl) - 1H - 1,3,5 - triazepine-3(2H)-ethanol, hexahydro-3-(2 - methoxyethyl) - 1,5 - bis (methylsulfonyl)-1H-1,3,5-triazepine or ethyl hexahydro-1,5-bis(methylsulfonyl)-1H-1,3,5-triazepine-3(2H) - acetate at a concentration of 1000 parts by weight per million parts of composition give complete kills and inhibition of *Salmonella typhosa, Staphylococcus aureus, Bacillus subtilis* and *Aerobacter aerogenes* when applied to nutrient media inoculated with the named organisms. In further operations aqueous compositions containing hexahydro-3-methyl-1,5-bis(methylsulfonyl)-1H-1,3,5-triazepine at a concentration of 1000 parts per million by weight give complete kills and inhibition of *Asperigillus terreus, Candida pelliculosa* and *Pullularia pullulans*.

The ethylene - bis(arylsubstituted - sulfonamides) employed as starting materials in the present invention are prepared by known procedures. In a representative procedure an excess of an aryl substituted sulfonylchloride is reacted with ethylene diamine in aqueous sodium hydroxide at room temperature.

Representative amines to be employed in the production of the compounds of the present invention include cyclohexylamine, 2-bromoaniline, 4-bromoaniline, 3-chloroaniline, 4-toluidine, 2-toluidine, 4-methoxyaniline, 3-methoxyaniline and 2-methoxyaniline.

I claim:
1. The 1,5 - bis(substituted-sulfonyl)-3-substituted-1H-1,3,5-hexahydrotriazepine compound corresponding to the formula

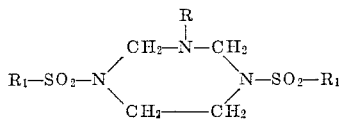

wherein R represents lower alkyl, cyclohexyl, 2-methoxyethyl, 2-hydroxyethyl, monohalophenyl, tolyl, monomethoxyphenyl, lower alkanesulfonic acid alkali metal salt, α-methyl-β-hydroxyethyl, or carboethoxy methyl, and $R_1$ represents alkyl of 1–12 carbons, monochlorophenyl, monobromophenyl, mononitrophenyl, tolyl or monomethoxyphenyl.

2. The compound claimed in claim 1 which is hexahydro - 3 - methyl - 1,5 - bis(methylsulfonyl) - 1H - 1,3,5-triazepine.

3. The compound claimed in claim 1 which is hexahydro - 3 - (methoxyethyl) - 1,5 - bis(methylsulfonyl)-1H-1,3,5-triazepine.

4. The compound claimed in claim 1 which is 3-hexyl-hexahydro-1,5-bis(methylsulfonyl)-1H-1,3,5-triazepine.

References Cited
UNITED STATES PATENTS 3,280,107  10/1966  Stryker _____ 260—239

ALTON D. ROLLINS, Primary Examiner

U.S. Cl. X.R.

71—92; 106—20, 316; 117—138.5, 147; 252—107; 260—814; 424—244